United States Patent Office 3,461,108
Patented Aug. 12, 1969

3,461,108
PROCESS OF FORMING COPOLYMERS OF MALEIC ANHYDRIDE AND AN ALIPHATIC OLEFIN HAVING SIX CARBON ATOMS
William J. Heilman, Allison Park, and David M. Jenkins, Verona, Pa., assignors to Gulf Research & Development Company, Pittsburgh, Pa., a corporation of Delaware
No Drawing. Filed Oct. 14, 1965, Ser. No. 496,136
Int. Cl. C08f 3/48, 15/00, 45/30
U.S. Cl. 260—78.5        12 Claims

ABSTRACT OF THE DISCLOSURE

Maleic anhydride and an aliphatic olefin having six carbon atoms, such as hexene-1, are copolymerized in the presence of a free radical catalyst and a solvent comprising a saturated dihalogenated aliphatic liquid hydrocarbon having from one to five carbon atoms, such as propylene dichloride. Enough solvent is employed to solubilize not only the reactants but also the copolymer products. The product is precipitated in a filterable particulate solid form by admixing the product with a non-solvent for the copolymer, such as n-heptane.

This invention relates to the preparation of a copolymer of maleic anhydride and an aliphatic alpha olefin having six carbon atoms per molecule in a particulate solid form.

The preparation of copolymers of maleic anhydride and various unsaturated monomers, especially ethylene and styrene, is well known in the art. Many of the prior art processes relating to the preparation of maleic anhydride copolymers teach the use of solvents for the reaction which dissolve the maleic anhydride and ethylene, but which are non-solvents for the resulting copolymer so that the copolymer precipitates as a solid during the reaction and is capable of being separated from the reaction mixture by filtration or otherwise. It has been found, however, that in the preparation of a copolymer of maleic anhydride and an aliphatic olefin having six carbon atoms per molecule, the resulting copolymers are very difficult to obtain in a particulate solid readily filterable form. Thus, typical solvents suggested in the art, such as benzene, chlorobenzene, dichlorobenzene, dimethylsulfoxide, xylene, toluene and others have been found unsuitable due to the difficulty of recovering a filterable solid product.

It has now been found in accordance with the invention that a copolymer of maleic anhydride and an aliphatic olefin having six carbon atoms per molecule can be produced and recovered in a filterable particulate solid form by a process which comprises: copolymerizing maleic anhydride and at least one of said olefins in the presence of a free radical catalyst and a solvent comprising a saturated dihalogenated aliphatic liquid hydrocarbon having between 1 and 5 carbon atoms, said solvent being used in an amount sufficient to solubilize the maleic anhydride, aliphatic olefin and the resulting copolymer; and thereafter admixing said copolymer product while in solution with a liquid material which is a non-solvent for the copolymer, the amount of said non-solvent being sufficient and the rate of addition of said copolymer solution being such as to result in the precipitation of the copolymer in a particulate solid form.

The olefinic reactant can be a single olefin or a mixture of two or more aliphatic olefins having six carbon atoms per molecule. The preferred olefins are the aliphatic alpha olefins having six carbon atoms per molecule and represented by the general formula:

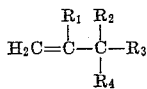

where $R_1$, $R_2$, $R_3$ and $R_4$ are selected from the group consisting of hydrogen and a saturated aliphatic hydrocarbon radical having between 1 and 3 carbon atoms, and wherein at least one of said R groups is a hydrocarbon radical, and wherein the sum of the carbon atoms in $R_1$, $R_2$, $R_3$ and $R_4$ is three.

The most preferred olefins for speed of reaction are the so-called vinylidene olefins which can be represented by the general formula:

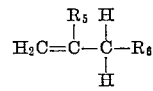

where $R_5$ is a saturated hydrocarbon radical having between 1 and 3 carbon atoms, and $R_6$ is selected from the group consisting of hydrogen and a hydrocarbon radical having between 1 and 2 carbon atoms, and wherein the sum of the carbon atoms in $R_5$ and $R_6$ is three. The vinylidene olefins also result in the production of copolymers having higher molecular weights than the non-vinylidene type alpha olefins.

Internal olefins, such as hexene-2, can be polymerized but with difficulty. Internal substituted olefins are even more resistant to polymerization.

Examples of suitable olefins include, but are not limited to, 1-hexene; 2-hexene; 2-methyl-1-pentene; 4-methyl-1-pentene; and 2,4-dimethyl-1-butene.

Maleic anhydride is the other reactant used to prepare the desired copolymers by the process of this invention. It is preferred that the maleic anhydride be substantially free of maleic acid. The maleic anhydride will, of course, react with water to form the undesired maleic acid. Commercial maleic anhydride is suitable for use in the process of the invention, but in the event it is exposed to water and thereby becomes contaminated with maleic acid, means should be employed to remove the maleic acid before the maleic anhydride is used in the subject process. One suitable method of purifying the maleic anhydride is to dissolve the maleic anhydride in a liquid, such as benzene which is a solvent for the maleic anhydride but a non-solvent for the maleic acid. The acid can then be separated by filtration or otherwise and the maleic anhydride recovered by evaporation of the benzene.

The unreacted maleic anhydride is usually the more difficult monomer to remove from the polymer, and therefore, it is desirable to react essentially all of the maleic anhydride. Both the rate at which the maleic anhydride reacts and the total conversion of maleic anhydride can be increased by increasing the olefinic reactant concentration relative to the maleic anhydride. The molar ratio of olefin to maleic anhydride can vary between 0.1:1 and 100:1 with preferred molar ratios between 1:1 and 4:1. Due to the greater reactivity of the vinylidene type olefins, a slightly lower molar ratio can be employed.

The polymerization reaction is a solution type polymerization wherein the maleic anhydride and olefin monomers are dissolved in a common solvent. The copolymerization can be initiated by any free-radical producing material well known in the art. The preferred free-radical initiators are the peroxide-type polymerization initiators and the azo-type polymerization initiators. Benzoyl peroxide is the most preferred initiator. Radiation can also be used to initiate the reaction, if desired.

The peroxide-type free-radical initiator can be organic or inorganic, the organic peroxides having the general formula:

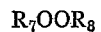

where $R_7$ is any organic radical and $R_8$ is selected from the group consisting of hydrogen and any organic radical. Both $R_7$ and $R_8$ can be organic radicals, preferably hydrocarbon, aroyl, and acyl radicals, carrying, if desired, substituents, such as halogens, etc. The most preferred peroxides are the diaroyl and diacyl peroxides.

Examples of suitable peroxides, which are in no way limiting, include benzoyl peroxide; lauroyl peroxide; tertiary butyl peroxide; 2,4-dichlorobenzoyl peroxide; tertiary butyl hydroperoxide; cumene hydroperoxide; diacetyl peroxide; acetyl hydroperoxide; diethylperoxycarbonate; tertiary-butyl perbenzoate; and the various compounds, such as the perborates.

The azo type compounds, typified by alpha, alpha'-azobisisobutyronitrile, are also well known free-radical promoting materials. These azo compounds can be defined as those having present in the molecule the group —N=N—, wherein the valences are satisfied by organic radicals, at least one of which is preferably attached to a tertiary carbon. Other suitable azo compounds include, but are not limited to: p-bromobenzenediazonium fluoborate; p - tolyldiazoaminobenzene; p - bromobenzenediazonium hydroxide; azomethane and the phenyldiazonium halides. A suitable list of azo type compounds can be found in U.S. 2,551,813, issued May 8, 1951 to Paul Pinkney.

The amount of initiator to employ, exclusive of radiation, of course, depends to a large extent on the particular initiator chosen, the olefinic charge stock and the reaction conditions. The initiator must, of course be soluble in the reaction medium. The usual concentrations of initiator are between 0.001:1 and 0.1:1 moles of initiator per mole of maleic anhydride, with preferred amounts between 0.005:1 and 0.03:1. In general, the more reactive olefins, such as the vinylidene type require smaller amounts of the initiator.

The polymerization temperature must be sufficiently high to break down the initiator to produce the desired free radicals. For example, using benzoyl peroxide as the initiator, the reaction temperature can be between 75° C. and 90° C., preferably between 80° C. and 85° C. Higher and lower temperatures can be employed, a suitable broad range of temperatures being between 20° C. and 200° C., with preferred temperatures between 50° C. and 120° C.

The reaction pressure can be atmospheric or below, but super-atmospheric pressures of up to 1,000 p.s.i.g., or higher, can be used. It is preferred to maintain the olefinic reactants in the liquid phase for better contacting. The preferred pressure is, of course, atmospheric pressure.

The reaction time is usually sufficient to result in the substantially complete conversion of the monomers to copolymer. The reaction time is suitably between 1 and 24 hours, with preferred reaction times between 2 and 10 hours.

The copolymers of this invention generally have inherent viscosities of between 0.05 and 1.5 deciliters per gram. This is measured by dissolving five grams of copolymer in one deciliter of acetone and measuring the inherent viscosities at 25° C. This inherent viscosity is a measure of molecular weight. Copolymers having higher or lower molecular weights, i.e. higher or lower viscosities, can be prepared.

As noted above, the subject reaction is a solution type polymerization reaction. The olefin, maleic anhydride, solvent and initiator can be brought together in any suitable manner. The important factors are intimate contact of the olefin and maleic anhydride in the presence of a free-radical producing material. The reaction, for example, can be conducted in a batch system where the olefin is added all initially to a mixture of maleic anhydride, initiator and solvent or the olefin can be added intermittently or continuously to the reaction pot. In another manner, the components in the reaction mixture can be added continuously to a stirred reactor with continuous removal of a portion of the product to a recovery train or to other reactors in series. The reaction can also suitably take place in a coil-type reactor where the components are added at one or more points along the coil.

The reaction solvent, as noted above, must be one which dissolves both the maleic anhydride and the olefinic monomer. It is necessary to dissolve the maleic anhydride and olefinic monomers, so as to bring them into intimate contact in the solution polymerization reaction. It has been found that the solvent must also be one in which the resulting copolymers are soluble, but not so soluble that the copolymers cannot be precipitated out of solution by the addition of a non-solvent for the copolymers.

It has now been found that certain solvents are unique for the subject reaction in that they dissolve the maleic anhydride, the olefinic monomers and the resulting copolymers, but yield a particulate solid copolymer when the mixture of solvent, copolymer and unreacted monomers is admixed with a liquid material which is a non-solvent for the copolymers.

These unique solvents comprise any liquid saturated aliphatic dihalogenated hydrocarbon having between 1 and 5 carbon atoms per molecule, preferably between 1 and 3 carbon atoms per molecule. By liquid is meant liquid under the polymerization reaction conditions. The halogens are preferably on adjacent carbon atoms. The amount of solvent must be such that it can dissolve the maleic anhydride and olefin monomers in addition to the resulting copolymers. The volume ratio of solvent to olefinic monomer is suitably between 1:1 and 100:1 and is preferably between 1.5:1 and 4:1.

The preferred solvents are the saturated dichlorinated hydrocarbons having between 1 and 5 carbon atoms, more preferably between 1 and 3 carbon atoms.

Examples of suitable saturated dihalogenated hydrocarbons, which are not meant to be limiting, include: dichloromethane; dibromomethane; diiodomethane; 1,1-diiodoethane; 1-bromo-2-chloro-ethane; 1,1-dibromoethane; 1,1-dichloroethane; 1,2-dichloroethane; 1,3-dibromopropane; 1,2-dibromopropane; 1,2-dibromo-2-methylpropane; 1,2-dichloropropane; 1,1-dichloropropane; 1,3-dichloropropane; 1-bromo-2-chloropropane; 1,2-dichlorobutane; 1,5-dibromopentane; and 1,5-dichloropentane.

The reaction mixture comprising the copolymer, any unreacted monomers, and the solvent is then added slowly to a liquid material which is a non-solvent for the copolymers. The non-solvent can be any inert liquid material in which the particular copolymer is substantially insoluble, that is, in which the copolymer will form a particulate solid without swelling. Swelling of the copolymers indicates that liquid is dissolved and trapped in the copolymers. The use of methanol and other alcohols will serve to precipitate the copolymers, but, the resulting product is contaminated with the half-ester due to the reaction of the alcohol with the anhydride groupings of the copolymer.

It has been found that the most suitable nonsolvent is any liquid saturated aliphatic hydrocarbon having between 4 and 20 carbon atoms. The lower carbon number paraffins can be employed, such as methane and propane, but high pressures would be required for liquification. Examples of suitable non-solvent compounds include, but are not limited to, butane; isobutane; pentane; isopentane; hexane; cyclohexane; octane; triptane; 3-ethylhexane; nonane; 2,2-dimethylheptane; 2,4,4-trimethylhexane; decane; pentadecane; heptadecane; octadecane; eicosane, 2-methylnonadecane; dodecylcylohexane and cyclooctane. Mixtures of these compounds can also, of course be employed, but are not as desirable as the mixture would be more difficult to separate from the solvent and unreacted monomers by distillation. Liquid olefinic materials, especially the low carbon atom olefins, such as those having between 4 and 20 carbon atoms, can also be employed as non-solvents. Other non-solvent materials include petroleum ether, Stoddard solvent and V.M. and P. naphtha.

The amount of non-solvent to employ should be sufficient to result in the precipitation of the copolymer in a particulate solid form. The exact amount will, of course, depend on the particular solvent—non-solvent combination employed, but, generally, the volume ratio of non-solvent to total reaction mixture is between about 1:1 and 5:1. The volume ratio can be as low as 0.5:1 and as high as 10:1 or more, if desired.

The usual procedure is to admix the total reaction mixture from the polymerization reactor including the solvent, copolymer, any unreacted monomers and initiator with the non-solvent by pouring or adding the total reaction mixture to the non-solvent at such a rate that the copolymer forms a fine particulate solid suitable for separation by filtration or centrifugation. If the opposite procedure is employed, namely, if the non-solvent is added to the total reaction mixture, the copolymer will tend to precipitate in larger size pieces which are not as desirable. The non-solvent is preferably stirred well during the addition of the total reaction mixture. It is also preferred to add the hot reaction mixture, at a temperature of between 50° and 95° C. to a cool non-solvent at a temperature between 20° and 50° C. Thus, the reaction mixture need not be cooled before addition to the non-solvent, and the addition of the hot reaction mixture to the cool non-solvent appears to aid in the formation of the finely divided particulate solid copolymer which is easily separable by filtration or centrifugation.

After the addition of the total reaction mixture to the non-solvent and the precipitation of the particulate solid copolymer, the copolymer is separated from the other components by any suitable means, such as by filtration or centrifugation. By following the process of this invention and using the defined solvent—non-solvent combinations, the copolymers are obtained in an easily filterable particulate solid form which has many advantages from the standpoint of ease of drying and handling. After separation of the copolymer solids, the remaining components can be separated by fractionation to recover the solvent, non-solvent and unreacted monomers for recycle. It is, therefore, also preferred to employ a particular solvent—non-solvent combination which are easy to separate by distillation.

The copoymer can be washed with any suitable liquid which can dissolve and thus remove any unreacted monomers. The solvent used in the reaction is suitable as are other materials, such as benzene. The wash liquid is preferably heated to aid in the washing procedure. While the copolymer may be soluble in the wash liquid, the rate of solution of the copolymer is so much slower than the rate of solution of the monomers that very little of the copolymer is dissolved in the wash liquid. The copolymer can then be dried by any conventional drying procedure to remove any residual solvent and/or washing liquids.

The copolymer products are essentially a chain of alternate groupings of maleic anhydride and the olefinic monomer reactants, this being true even though much higher or lower ratios of olefin to maleic anhydride than 1:1 were employed. The copolymers are useful for many purposes, including their use as dispersants for pigments, or as intermediates in the preparation of polyesters by their reaction with polyols or polyepoxides.

The invention will be further described with reference to the following specific examples.

A series of runs were made copolymerizing hexane-1 and maleic anhydride. The reaction system consisted of 1,000 cc. of propylene dichloride, 198 grams of maleic anhydride (2 moles), 4.84 grams of benzyol peroxide (0.02 mole) and varying amounts of hexene-1. The reaction conditions included a temperature of 75° to 80° C. (reflux), a pressure of atmospheric and a reaction time of 24 hours. Table I below is a summary of the series of runs showing the amount of hexene-1 used and the appearance of the reaction mixture.

TABLE I

| Example No. | Hexene-1 (moles) | Hexene-1 (cc.) | Temp., °C. | Appearance of reaction product |
| --- | --- | --- | --- | --- |
| 1 | 2 | 250 | 80 | Solution. |
| 2 | 3 | 375 | 80 | Do. |
| 3 | 4 | 500 | 80 | Do. |
| 4 | 6 | 750 | 77 | Viscous polymer phase, could be stirred. |
| 5 | 8 | 1,000 | 75 | Do. |

The hexene-1 actually acts as a non-solvent and as the ratio of hexene-1 to propylene dichloride increases, the polymer forms a second liquid phase (note Examples 4 and 5). It is preferred that the volume of solvent employed be sufficient to keep the polymer in solution, since the separate liquid polymer tends to deposit on the surfaces of the reactor and elsewhere causing great difficulties in recovery and cleaning. Hence in the case of hexene-1 and propylene dichloride, the volume ratio of propylene dichloride to hexene-1 should be greater than about 2:1.

In all of the examples in Table I, the warm polymer solution was added with stirring to heptane at room temperature, the amount of heptane being about 2,000 cc. A fine (25 to 35 pounds per cubic foot bulk density) easily filtered particulate solid product was obtained. By a particulate solid in this application is meant particles of copolymer solid which will not agglomerate under the normal conditions of isolation of the solid, such as by filtration, drying, etc. Usually the bulk density of the copolymer solids is between 15 and 40 pounds per cubic foot, preferably between 25 and 35 pounds per cubic foot. Unreacted maleic anhydride was removed by leaching the copolymer solids with boiling heptane.

A series of runs were made copolymerizing 2-methyl-1-pentene and maleic anhydride. The same procedure used in Examples 1 through 5 was employed here. The results are shown on Table II below:

TABLE II

| Example No. | 2-methyl-1-pentene | | Temp., °C. | Appearance of reaction product |
| --- | --- | --- | --- | --- |
| | Moles | Cc. | | |
| 6 | 2 | 250 | 80 | Cloudy solution. |
| 7 | 3 | 375 | 78–80 | Cloudy viscous solution. |
| 8 | 4 | 500 | 85 | Very viscous, difficult to stir, nearly all one phase with some light clear liquid on surface. |

The above runs 6 through 8 show the volume ratio of propylene dichloride to olefin should be at least 2:1. The copolymers were precipitated by addition to heptane, as shown in Examples 1 to 5. The products were recovered in an easily filterable particulate solid form.

EXAMPLE 9

Example 3 was repeated except ethylene dichloride was employed as the solvent. Substantially the same results were obtained, that is, the copolymer was recovered from the heptane in an easily filterable particulate solid form. The dilute solution viscosity of the copolymer was 0.279.

EXAMPLE 10

Example 9 was repeated except methylene chloride was used in place of ethylene dichloride. Substantially the same results were obtained. The dilute solution viscosity of the copolymer was 0.281.

EXAMPLE 11

Example 3 was repeated except VAZO (alpha,alpha'-azobisisobutyronitrile) was used as the initiator. The maleic anhydride conversion, assuming a 1:1 ratio of $C_6$ to maleic anhydride, was 75.2 percent. The copolymer was recovered in a particulate solid form.

EXAMPLE 12

Example 10 was repeated except the olefin to maleic anhydride ratio was 4:2 and the initiator was lauroyl peroxide. Substantially the same results were obtained.

A comparison of Examples 10, 11 and 12 shows that various initiators can successfully be employed.

In order to show the importance of using the type of solvents defined above, a number of runs were made using various liquid materials as solvents.

EXAMPLE 13

In the run for this example, 84 grams of hexene-1 were reacted with 98 grams of maleic anhydride in 300 cc. of benzene using 1.1 grams of benzoyl peroxide as the catalyst. The reaction mixture was refluxed (75° C.) for 12 hours during which time the copolymer precipitated from solution as a gummy mass which coated the reactor walls.

EXAMPLE 14

Example 13 was repeated except 2-methyl-1-pentene was used in place of hexene-1. Substantially the same results were obtained.

EXAMPLE 15

Example 13 was repeated except 500 cc. of chlorobenzene were used in place of benzene and the reaction time was 24 hours. The copolymer precipitated during reaction and was swollen and tacky.

EXAMPLE 16

Example 15 was repeated except o-dichlorobenzene was used in place of benzene and 125 cc. of hexene-1 were employed. Substantially the same results were obtained.

EXAMPLE 17

In the run for this example, 67 grams (100 cc.) of hexene-1 were reacted with 7814 grams of maleic anhydride in 400 cc. of xylene using 1.04 grams of benzoyl peroxide as the catalyst. The reaction was carried out at 60° C. for 165 hours. The copolymer formed during reaction as a large semi-solid gummy agglomerated mass.

EXAMPLE 18

Example 17 was repeated except the reaction solvent was 200 cc. of benzene and 200 cc. of ethyl ether. Substantially the same results were obtained.

EXAMPLE 19

In the run for this example, 3,000 cc. of hexene-1 were reacted with 1,176 grams of maleic anhydride in 6,000 cc. of toluene using 15.6 grams of benzoyl peroxide as the catalyst. The reaction temperature was 88°–90° C. for a time of 24 hours. The copolymer formed as an agglomerated mass during reaction.

EXAMPLE 20

In the run for this example, 250 cc. of 2-methyl-1-pentene were reacted with 98 grams of maleic anhydride in 500 cc. of ethyl acetate at 70° C. for 24 hours using 2.4 grams of benzoyl peroxide as the catalyst. The reaction mixture was very viscous and opaque (whitish) and when poured into n-heptane, a gummy non-filterable product was obtained.

A comparison of Examples 13 through 20 with Examples 1–10 shows the advantages of employing the solvent and non-solvents of this invention. When solvents other than the chlorinated hydrocarbons of this invention are employed, the copolymer product is obtained either directly during reaction [Examples 13–19] or after addition to a non-solvent [Example 20] in an agglomerated gummy mass which is difficult to further handle in order to obtain a finished dry copolymer in a particulate solid form. The chlorinated solvents are, as shown by the examples above, unique in the process of the subject invention in not only dissolving the maleic anhydride, olefin monomer, and copolymer product, but in allowing the copolymer to precipitate in the desired particulate solid form when added to a liquid non-solvent. Other runs were made using ketones, such as methyl isobutyl ketone as the solvent, but poor yields of a gummy precipitate were obtained.

EXAMPLE 21

In the run for this example, 280 grams of pentene-1 were reacted with 196 grams of maleic anhydride in 1,000 cc. of propylene dichloride at 80° C. for nine hours using 4.84 grams of benzoyl peroxide as the catalyst. The copolymer precipitated out on the walls of the reaction vessel.

EXAMPLE 22

Example 21 was repeated except the olefin was decene-1 and the solvent was tertiary amylchloride. The copolymer did not precipitate out of solution even when added to 1,000 cc. of n-heptane non-solvent.

A comparison of Example 21 and Example 22 with Examples 1–10 shows that olefins having six carbon atoms are unique in the process of this invention for producing a copolymer with maleic anhydride in a particulate solid form.

Resort may be had to such variations and modifications as fall within the spirit of the invention and the scope of the appended claims.

We claim:

1. A process for the preparation of a copolymer of maleic anhydride and an aliphatic olefin having six carbon atoms per molecule in a particulate solid form which comprises:

copolymerizing maleic anhydride and at least one of said olefins in the presence of a free-radical catalyst and a solvent comprising a saturated dihalogenated aliphatic liquid hydrocarbon having between 1 and 5 carbon atoms, said solvent being used in an amount sufficient to solubilize the maleic anhydride, aliphatic olefin and the resulting copolymer; and thereafter admixing said copolymer product while in solution with a liquid material which is a non-solvent for the copolymer, the amount of said non-solvent being sufficient and the rate of addition of said copolymer solution being such as to result in the precipitation of the copolymer in a particulate solid form.

2. A process according to claim 1 wherein the olefin has the general formula:

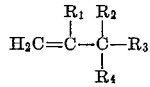

where $R_1$, $R_2$, $R_3$ and $R_4$ are selected from the group consisting of hydrogen and a saturated aliphatic hydrocarbon radical having between 1 and 3 carbon atoms, and wherein at least one of said R groups is a hydrocarbon radical, and wherein the sum of the carbon atoms in $R_1$, $R_2$, $R_3$ and $R_4$ is three.

3. A process according to claim 1 wherein the olefin is hexene-1.

4. A process according to claim 1 wherein the copolymer solution is at a higher temperature than the liquid non-solvent when the copolymer solution is added to the non-solvent.

5. A process according to claim 1 wherein the dihalogenated aliphatic liquid hydrocarbon has between 1 and 3 carbon atoms.

6. A process for the preparation of a copolymer of maleic anhydride and an aliphatic alpha olefin having six carbon atoms per molecule in a particulate solid form which comprises:

copolymerizing maleic anhydride and at least one of said alpha olefins in the presence of a free radical catalyst and a solvent comprising a saturated dichlorinated aliphatic liquid hydrocarbon having between 1 and 5 carbon atoms, said solvent being used in an amount sufficient to solubilize the maleic anhydride, aliphatic alpha olefin and the resulting copolymer; and thereafter admixing said copolymer product while in solution with a liquid material which is a non-solvent for the copolymer, the amount of said non-solvent being sufficient and the rate of addition of said copolymer solution being such as to result in the precipitation of the copolymer in a particulate solid form.

7. A process according to claim 6 wherein the dichlorinated hydrocarbon has between 1 and 3 carbon atoms and the olefin has the general formula:

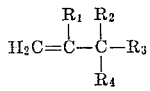

where $R_1$, $R_2$, $R_3$ and $R_4$ are selected from the group consisting of hydrogen and a saturated aliphatic hydrocarbon radical having between 1 and 3 carbon atoms, and wherein at least one of said R groups is a hydrocarbon radical, and wherein the sum of the carbon atoms in $R_1$, $R_2$, $R_3$ and $R_4$ is three.

8. A process for the preparation of a copolymer of maleic anhydride and an aliphatic alpha olefin having six carbon atoms per molecule in a particulate solid form which comprises:

copolymerizing the maleic anhydride and at least one of said alpha olefins in a molar ratio of olefin to maleic anhydride between 0.1:1 and 100:1 under polymerization conditions in the present of a free-radical catalyst and a solvent comprising a saturated dichlorinated aliphatic liquid hydrocarbon having between 1 and 3 carbon atoms, said solvent being used in an amount sufficient to solubilize the maleic anhydride, aliphatic alpha olefin and the resulting copolymer; and thereafter admixing said copolymer product while in solution with a liquid saturated aliphatic hydrocarbon non-solvent having between 4 and 20 carbon atoms and which is at a lower temperature than the copolymer solution, the amount of said non-solvent being sufficient and the rate of addition of said copolymer solution being such as to result in the precipitation of the copolymer in a particulate solid form.

9. A process in accordance with claim 8 wherein the aliphatic alpha olefin is hexene-1.

10. A process according to claim 8 wherein the aliphatic alpha olefin is 2-methyl-1-pentene.

11. A process in accordance with claim 8 wherein the non-solvent is heptane.

12. A process in accordance with claim 8 wherein the aliphatic alpha olefin is hexene-1, the solvent is propylene dichloride, and the non-solvent is heptane.

References Cited

UNITED STATES PATENTS

| 3,207,718 | 9/1965 | Zimmerman et al. | 260—78.5 XR |
| 3,318,851 | 5/1967 | Nicholls et al. | 260—78.5 |

FOREIGN PATENTS 588,577   12/1959   Canada.

JOSEPH L. SCHOFER, Primary Examiner
J. KIGHT, Assistant Examiner

U.S. Cl. X.R.

260—33